Dec. 28, 1943.   L. E. SODERQUIST   2,337,857
APPARATUS FOR SHAPING AND VULCANIZING PNEUMATIC TIRES
Filed Nov. 4, 1942   3 Sheets-Sheet 2

Inventor
LESLIE E. SODERQUIST
By
Attorneys

Dec. 28, 1943.   L. E. SODERQUIST   2,337,857
APPARATUS FOR SHAPING AND VULCANIZING PNEUMATIC TIRES
Filed Nov. 4, 1942   3 Sheets-Sheet 3

Inventor
LESLIE E. SODERQUIST
By Ely & Frye
Attorneys

UNITED STATES PATENT OFFICE 2,337,857

APPARATUS FOR SHAPING AND VULCANIZING PNEUMATIC TIRES

Leslie E. Soderquist, Akron, Ohio, assignor to The McNeil Machine & Engineering Company, Akron, Ohio, a corporation of Ohio Application November 4, 1942, Serial No. 464,450

14 Claims. (Cl. 18—17)

The present invention relates to the art of vulcanizing pneumatic tires and discloses an apparatus by which the unvulcanized tire, which is generally made in the well known "pulley band" form, is shaped and cured upon an expansible diaphragm which is secured as a permanent part of the press in which the tire is vulcanized. This permanent diaphragm acts as a substitute for the ordinary air bag such as has been employed for curing tires under internal pressure.

The apparatus shown and described herein is in the nature of an improvement upon the apparatus shown in my prior Patent No. 2,296,800, issued September 22, 1942. The present device is a simpler and more efficient form of apparatus for shaping the pulley band and expanding the tire into contact with the mold during curing and for withdrawing the expansible diaphragm from within the tire. In the device shown in my former patent, the heavy bag was held and supported between two clamping members, one of which was moved as the press closed so as to assist in the formation and expansion of the curing bag. In the form of apparatus shown and described herein, the expansible diaphragm or "bag" is held in a fixed chamber into which it is withdrawn when the press is opened and the tire band placed in position therein and into which the diaphragm recedes after the vulcanization is completed.

The apparatus shown herein eliminates the bagging operation in a more efficient manner than earlier forms of apparatus constructed for the same general purpose.

In the drawings in which the best known and preferred form of the invention is shown, the details of the mechanism for opening and closing the mold sections about the tire are not shown as the invention may be used with any well known type of press. It will also be understood that adherence to the details of construction are not essential and that changes and modifications may be made in specific embodiments of the invention.

Figure 1:
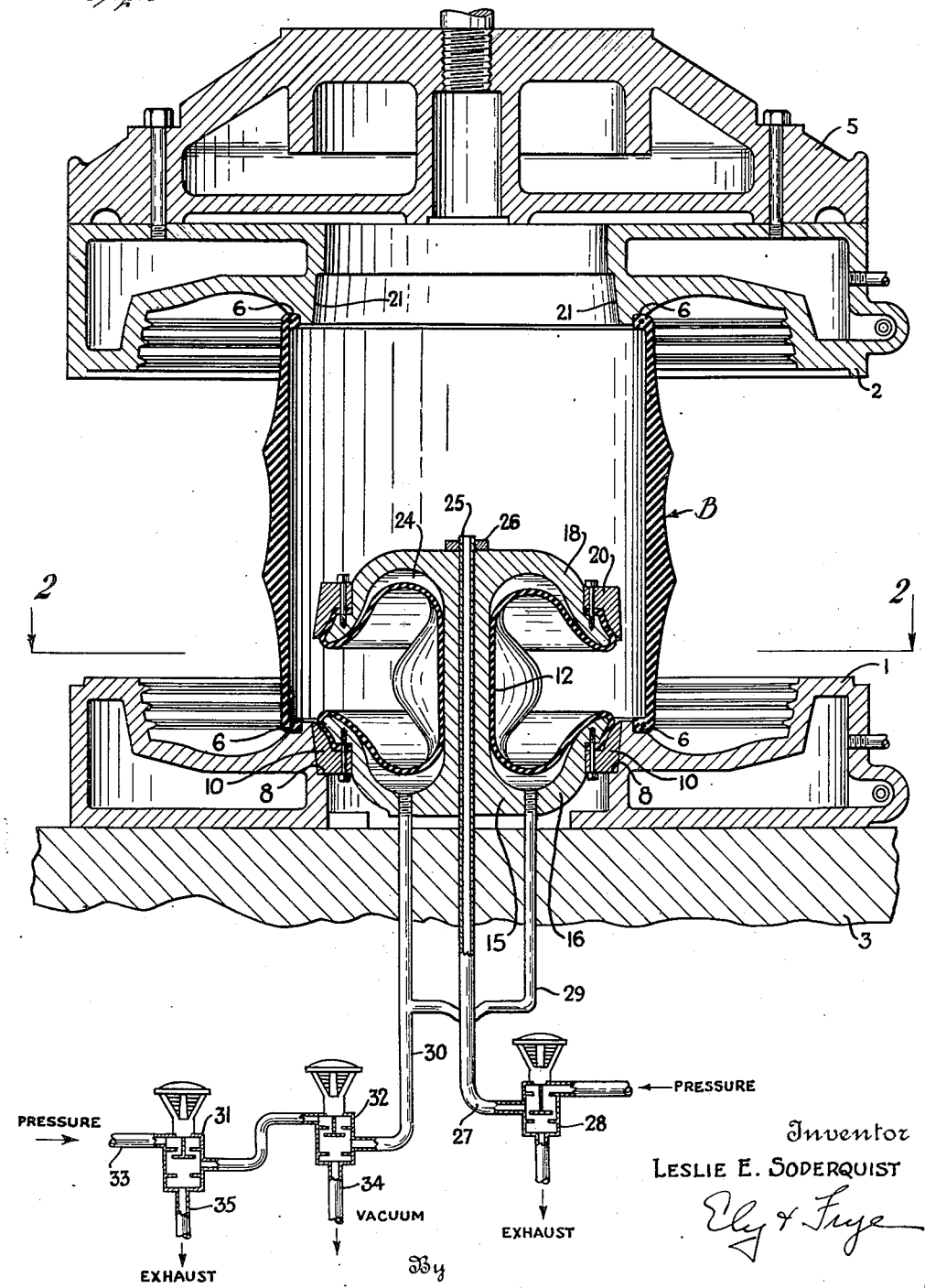
Fig. 1 is a vertical sectional view showing two mold sections in the position that they occupy when the press is opened and the band placed in position.

In the drawings, 1 is a lower mold section and 2 the upper mold section, both of which are steam jacketed as is usual in press constructions. In the form shown, the lower section is secured to a stationary platen 3 and the upper mold section to the movable crosshead 5. No means are shown for actuating the movable crosshead, for any suitable mechanism for this purpose may be employed, nor is it essential that the upper mold section be the movable one, as the lower mold section may be moved and the portion 5 may be stationary, or both sections may be moved in opening and closing the press. Nor is the steam jacketed mold construction essential as any other means may be employed to heat the mold sections to vulcanizing temperature.

The mold surfaces are of any usual or standard form which include the bead molding portions 6 in which the bead portions of the uncured tire band B are seated, as shown in Fig. 1. The open position shown in this view need not be the extreme position to which the movable mold section is opened, for, in order to facilitate the positioning of the uncured tire band, the head 5 may be raised somewhat so as to permit the band to be placed over the diaphragm chamber and on the lower bead seat 6, whereupon the upper mold is lowered until the band is seated accurately at both bead seats.

Located in a seat 8 in the lower mold section 1 is a ring 10 on which is placed the lower edge of the inflatable diaphragm or air bag 12. This is a relatively thin-walled, rubber band or diaphragm which is sufficiently strong to withstand the internal pressure upon which the tire is cured, but is flexible so that it can be bent upon itself sufficiently to retreat wholly within the chamber provided for that purpose.

The chamber referred to is, in the form shown in the drawings, a casting or double bell 15, the lower flange 16 of which fits within the seating ring 10, the lower edge of the diaphragm being clamped between the members 10 and 16 so as to make a secure air and water tight seam at this point. The upper edge of the diaphragm 12 is similarly clamped between the upper flange 18 of the bell and a ring 20 corresponding to the ring 10 but adapted to fit within a seat 21 formed on the interior of the upper mold section 2 when the mold is brought together. Between the flanges 16 and 18 there is a large room or chamber, indicated at 24, into which the diaphragm will be drawn and folded when the interior of the chamber 24 is evacuated through the throat 23 between the flanges.

The chamber or double bell is secured to the lower platen 3 by a pipe 25, the upper end of which is threaded to receive a nut 26 which holds the chamber so that it is in register with the interior of the tire when the mold is closed. The pipe is connected to an air pressure line 27 supplied under sufficient pressure, say about ten pounds, to insure that, as the molds come together, the tire band will bulge outwardly. A valve 28 is provided in the line 27 so that after the tire has started to form properly the pressure may be relieved.

Communicating with the interior of the chamber are ducts 29 from a line 30 in which are located two three-way valves 31 and 32 by which the chamber is connected selectively with a pressure line 33, a vacuum line 34 and an exhaust line 35.

Figure 2:
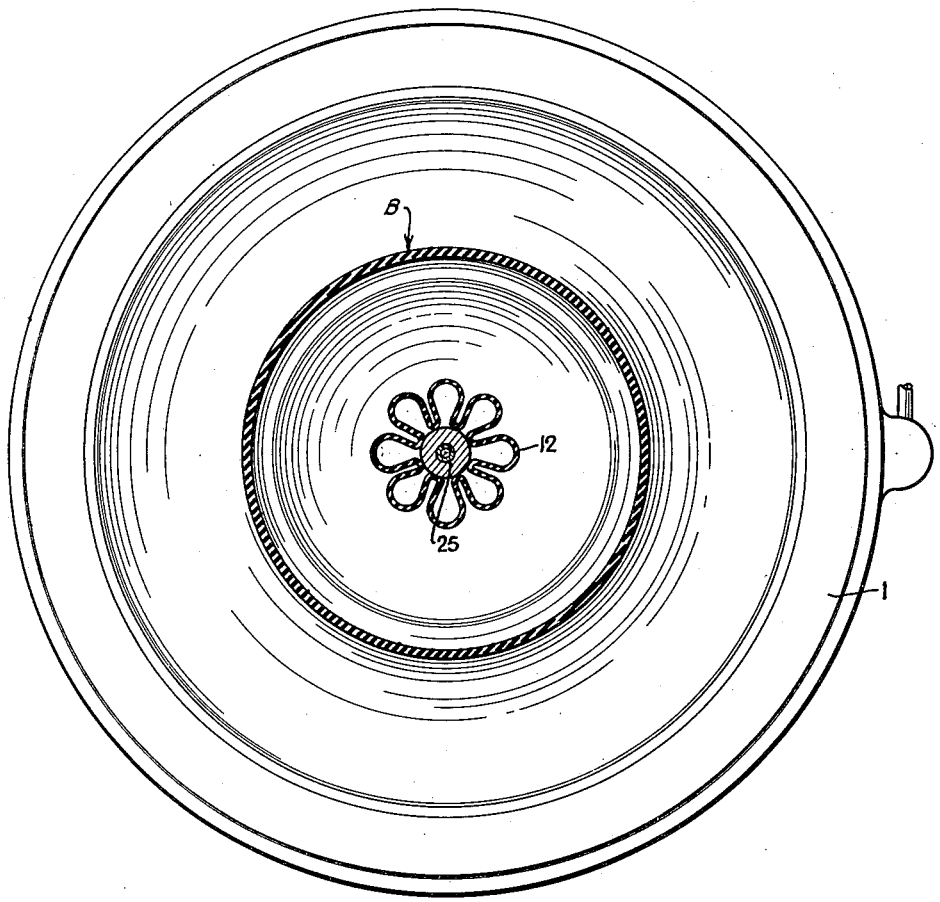
Fig. 2 is a section on the line 2—2 of Fig. 1.
Figure 4:
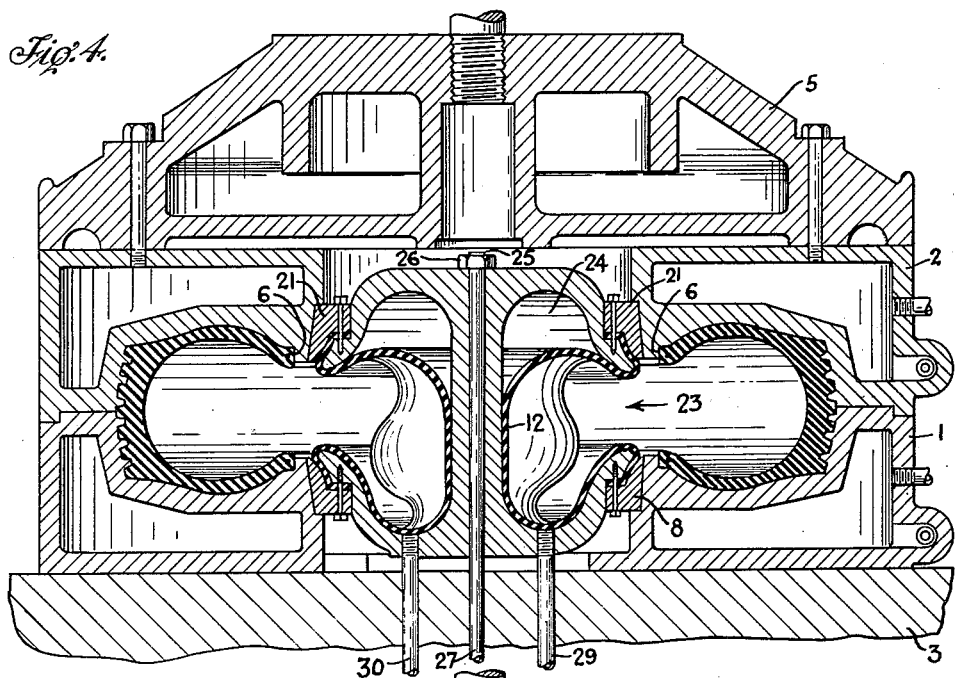
Fig. 4 is a similar view showing the condition when the curing diaphragm or bag is withdrawn after the cure, the press being ready to open and release the cured tire.
Figure 3:
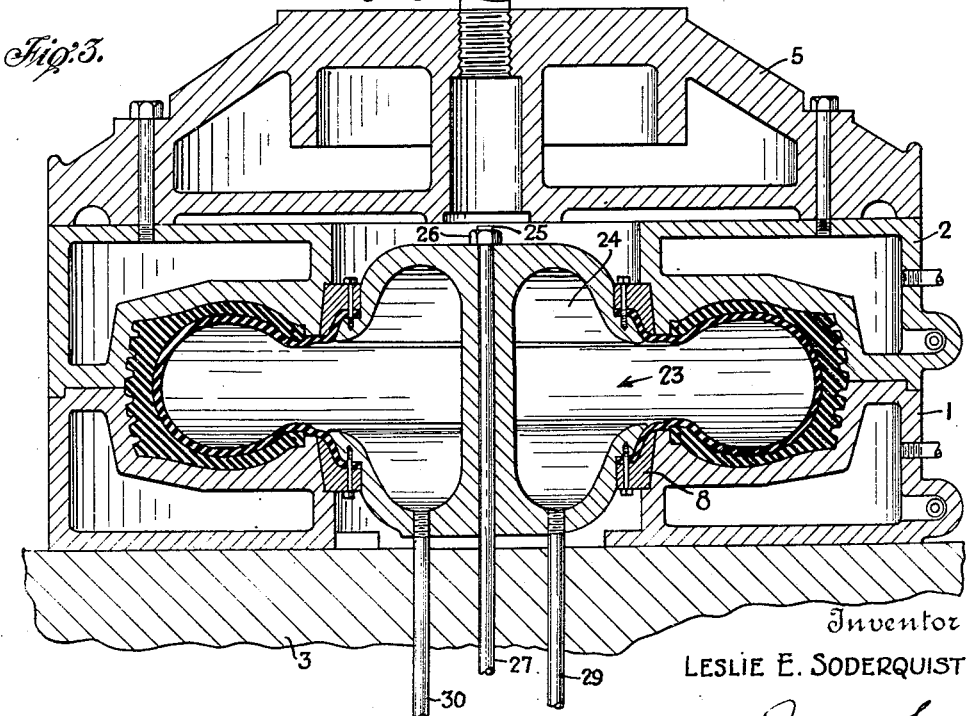
Fig. 3 is a view similar to Fig. 1, but showing the press in closed position as during the curing operation.

The operation may be briefly described:

The press being opened to the extent shown in Fig. 1, or greater, the unvulcanized tire in pulley band form is inserted over the bell and placed and adjusted so that the bead portions of the band are squarely seated at the points 6. At this time the diaphragm is withdrawn into the chamber 24 by the application of vacuum to the chamber. The diaphragm will fold upon itself in approximately the form shown in Fig. 2 so that it is wholly out of the way. As the molds are brought together, the center of the pulley band tends to bulge outwardly, an action which is assisted by applying pressure to the interior of the band from the line 27. As the molds approach their closed position, the valve 28 is operated to shut off the pressure and to open the exhaust, and about this time pressure is admitted to the chamber in the rear of the diaphragm which causes it to swell outwardly between the flanges or rims 16 and 18 and force the tire band into its completely formed condition against the walls of the mold. The operation is timed so that shortly after the molds are closed, the diaphragm reaches its fully expanded position, and the internal pressure is continued during the curing operation. The medium used for the expansion of the diaphragm is usually superheated water under pressure as this is the generally preferred medium upon which tires are cured, but steam or other fluid medium may be employed.

After the press has remained in closed position for a sufficient time to effect the cure, the valve 31 is opened to the exhaust so as to permit the pressure fluid to drain away from the diaphragm and then the valve 32 is connected to the vacuum line which forcibly evacuates the diaphragm, stripping it from the interior of the tire and causing it to collapse within the chamber 24. The mold is then opened and the cured tire removed therefrom.

Among the advantages of the system shown in the present application over those shown in prior applications of this type is that the absence of moving parts heretofore associated with the inflatable diaphragm reduces the points at which leakage may occur. This is a very important advance because the medium usually employed, superheated water, is very difficult to confine and will seep through and destroy packings and gaskets required to seal the moving parts of the diaphragm actuating means. The only points which have to be sealed are about the edges of the bell flanges 16 and 18, which is not difficult.

Also, by having the stationary chamber located in the center of the press, it is much easier to insert the band and remove the vulcanized tire. This is quite a problem in handling very large and heavy tire casings and bands. Also, the diaphragm may be made of a lighter, more flexible material than in former devices of this type.

What is claimed is:

1. An apparatus for shaping unvulcanized tire pulley bands and vulcanizing them in tire shape, comprising two relatively movable mold members, a diaphragm carrying member arranged between the mold members and having a fixed chamber provided with an opening around the periphery thereof, an inflatable diaphragm the edges of which are secured to said carrying member about the opening, and means communicating with the interior of the chamber to admit fluid under pressure and to evacuate the chamber.

2. An apparatus for shaping unvulcanized tire pulley bands and vulcanizing them in tire shape, comprising two relatively movable mold members, a diaphragm carrying member arranged between the mold members and having a fixed chamber provided with an opening about its periphery, a flexible and inflatable diaphragm the edges of which are secured to the edges of said carrying member adjacent said opening, means to force the diaphragm outwardly through the opening into contact with the interior of the tire band when the mold members are brought together prior to vulcanization, and means to draw the diaphragm into the chamber after vulcanization before the mold sections are moved apart.

3. In a tire shaping and vulcanizing press comprising two relatively movable mold sections, a diaphragm carrying member arranged between the bead portions of the mold sections and having a fixed chamber provided with a reduced throat in alignment with the interior of the tire when the mold sections are closed, a flexible diaphragm attached to said member adjacent said throat, and means to force the diaphragm out of the chamber and into the tire as the mold is closed before vulcanization and to withdraw the diaphragm through the throat into said chamber to release the vulcanized tire before the mold sections are opened.

4. In a tire shaping and vulcanizing press comprising two relatively movable mold sections, a diaphragm carrying member arranged between the bead portions of the mold sections and having a fixed chamber provided with a reduced throat in alignment with the interior of the tire when the mold sections are closed, a flexible diaphragm attached to said member adjacent said throat, pressure means to force the diaphragm out of the chamber and into the tire as the mold is closed before vulcanization, and suction means to withdraw the diaphragm through the throat into said chamber to release the vulcanized tire before the mold sections are opened.

5. In a tire shaping and vulcanizing press, two relatively movable mold sections, one of which is provided with a diaphragm receiving chamber of unvarying size having an opening about its periphery in register with the interior of the mold cavity when the mold sections are brought together, an inflatable diaphragm arranged adjacent said opening, and means to connect the interior of the chamber selectively with a source of fluid under pressure and with evacuating means to move said diaphragm out of and into said chamber.

6. An apparatus in accordance with claim 3 provided with fluid pressure means for causing the band to bulge outwardly at the center as the molds approach.

7. An apparatus in accordance with claim 4 having a fluid pressure line opening into the interior of the unshaped tire.

8. An apparatus for shaping unvulcanized tire pulley bands and vulcanizing them in tire shape, comprising a pair of relatively movable mold sections, a diaphragm carrying member having a fixed chamber therein secured to one of said sections, an inflatable diaphragm carried by said member and movable to a position wholly within said chamber, and means for moving said diaphragm into and out of said chamber.

9. An apparatus for shaping unvulcanized tire pulley bands and vulcanizing them in tire shape, comprising upper and lower relatively movable mold sections, a diaphragm carrying member having a fixed chamber therein secured to said lower mold section, an inflatable diaphragm carried by said member and movable to a position wholly within said chamber, and means for moving said diaphragm into and out of said chamber.

10. An apparatus for shaping unvulcanized tire pulley bands and vulcanizing them in tire shape, comprising a pair of mold sections movable relatively to open and closed positions, a diaphragm carrying member secured to one of said sections, said member having a chamber therein of a size which remains constant whether said mold sections are in their open or closed positions, an inflatable diaphragm carried by said member and movable to a position wholly within said chamber, and means for moving said diaphragm into said chamber when said mold sections are in either of said positions.

11. An apparatus for shaping unvulcanized tire pulley bands and vulcanizing them in tire shape, comprising upper and lower mold sections movable relatively to open and closed positions, a diaphragm carrying member secured to said lower mold section, said member having a chamber therein of a size which remains constant when said mold sections are in either of said positions, an inflatable diaphragm carried by said member and movable to a position wholly within said chamber, and means for moving said diaphragm into said chamber when said mold sections are in either of said positions.

12. An apparatus for shaping unvulcanized tire pulley bands and vulcanizing them in tire shape, comprising a pair of relatively movable mold sections, a double-bell shaped diaphragm carrying member having a fixed chamber therein with a reduced throat secured to one of said mold sections, an inflatable diaphragm carried by said member and movable through said throat to positions within and without said chamber, pressure means for forcing said diaphragm out of said chamber, and vacuum means for drawing said diaphragm into said chamber.

13. An apparatus for shaping unvulcanized tire pulley bands and vulcanizing them in tire shape, comprising upper and lower relatively movable mold sections, a double-bell shaped diaphragm carrying member having a fixed chamber therein with a reduced throat secured to said lower mold section, an inflatable diaphragm carried by said member and movable through said throat to positions within and without said chamber, pressure means for forcing said diaphragm out of said chamber, and vacuum means for drawing said diaphragm into said chamber.

14. In an apparatus for shaping unvulcanized tire pulley bands and vulcanizing them in tire shape, a pair of relatively movable mold sections, a flexible and expansible diaphragm, a support for said diaphragm carried by one of said mold sections, said support comprising upper and lower bell-shaped members to which said diaphragm is secured, said bell-shaped members remaining a constant distance apart at all times and defining a fixed chamber into which said diaphragm is movable, and means for moving said diaphragm into and out of said chamber.

LESLIE E. SODERQUIST.